United States Patent [19]

Delatorre et al.

[11] 3,800,586
[45] Apr. 2, 1974

[54] LEAK TESTING APPARATUS
[75] Inventors: Leroy C. Delatorre, Spring; William J. Rapson, Jr.; Paul H. Lemson, both of Houston, all of Tex.
[73] Assignee: Uson Corporation, Houston, Tex.
[22] Filed: Apr. 24, 1972
[21] Appl. No.: 246,633

[52] U.S. Cl. .............................................. 73/49.2
[51] Int. Cl. .......................................... G01m 3/02
[58] Field of Search ............... 73/49.2, 49.3, 52, 40

[56] References Cited
UNITED STATES PATENTS
| 3,438,259 | 4/1969 | Bossert, Jr. | 73/49.3 X |
| 3,653,264 | 4/1972 | Mills | 73/49.2 X |
| 2,784,373 | 3/1957 | Lawrance et al. | 73/49.3 X |
| 2,872,806 | 2/1959 | Mamzic | 73/40 |

FOREIGN PATENTS OR APPLICATIONS
534,010   2/1941   Great Britain .................... 73/49.3

Primary Examiner—Richard C. Queisser
Assistant Examiner—Joseph W. Roskos
Attorney, Agent, or Firm—Jefferson D. Giller; James F. Weiler; William A. Stout

[57] ABSTRACT

An apparatus for testing for leaks in a test item by subjecting the item to a test pressure, closing a valve to contain the pressure in the test item, and measuring the change in the pressure in which the apparatus measures the initial pressure in the test item after the item is closed and compares the change in pressure relative to the initial pressure value thereby determining the extent of any leak in the test item. The test item may be subjected to a pressurized gas or vacuum. In subjecting the test item to a positive pressurized gas, an electrical signal is generated providing a compensating exponential signal of equal and opposite value to the dissipation of the adiabatic heat as the pressurized gas in the test item cools after closing.

4 Claims, 4 Drawing Figures

TYPICAL MECHANICAL INSTALLATION

TYPICAL MECHANICAL INSTALLATION
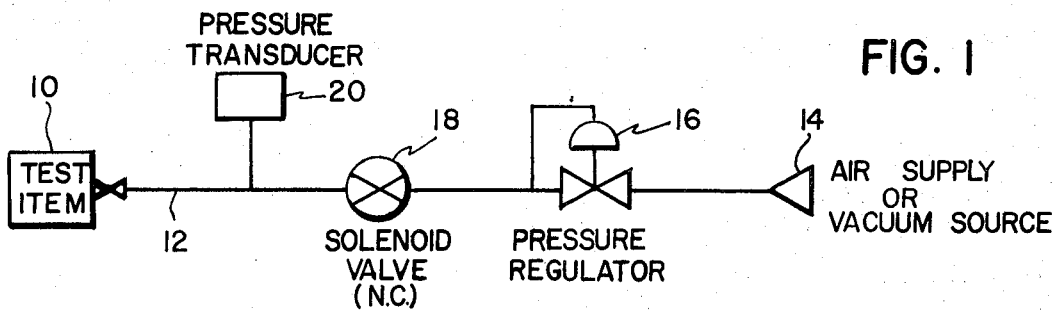
FIG. 1
FIG. 3
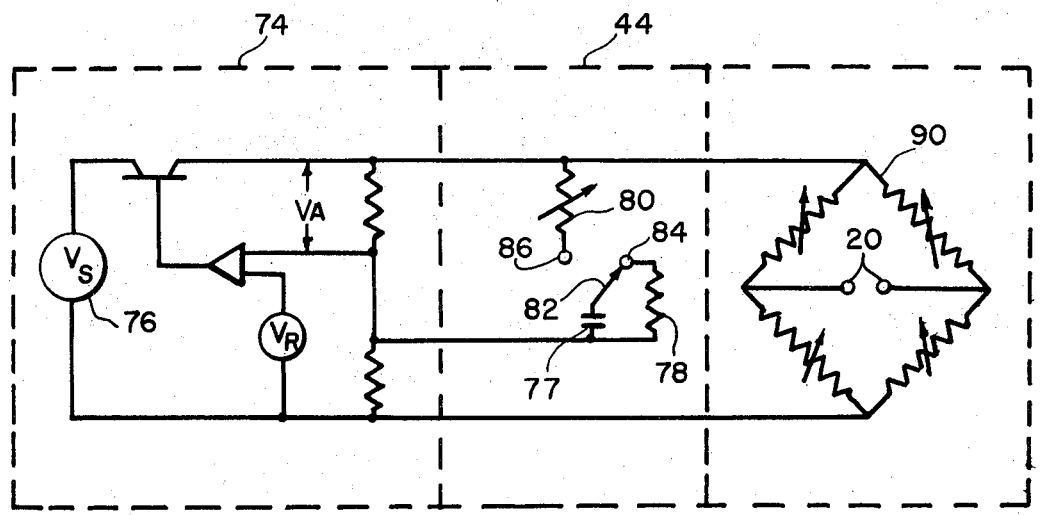
FIG. 4
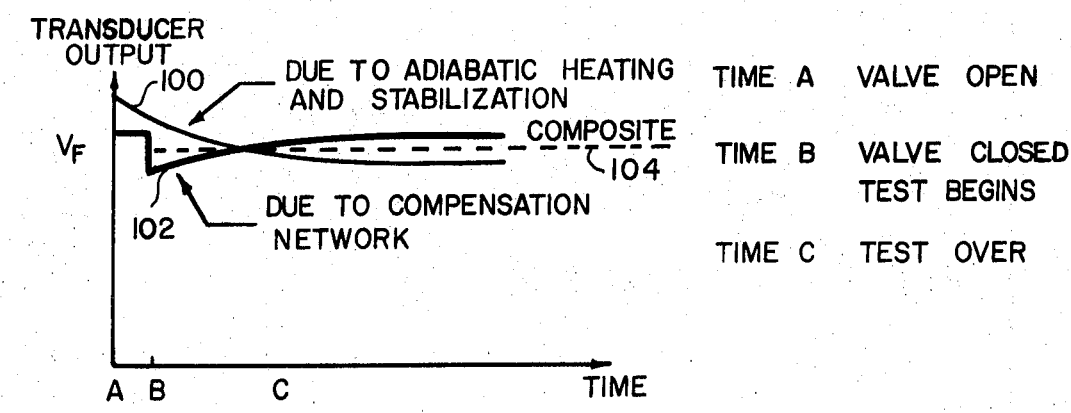
TIME A VALVE OPEN
TIME B VALVE CLOSED TEST BEGINS
TIME C TEST OVER

3,800,586

LEAK TESTING APPARATUS

BACKGROUND OF THE INVENTION

Pressure decay leak testing is a way of determining leakage in a test item by pressurizing the test item to a given test pressure, closing off the pressure source and monitoring the decay in pressure which is a function of leakage. This has been done in the past by measuring the pressure decay from the test item or by using a reference test item identical to or simulation of the test item with a differential pressure transducer therebetween. While the concept of measuring a leak in an item by monitoring pressure decay is simple, there are a number of difficulties that are encountered in actual practice. The most important of these are: (1) adiabatic heating of the pressurizing gas occurs when the test item is pressurized due to compression. This results in a pressure decay after the test item is closed due to the dissipation of this adiabatic heating thereby causing an error in the pressure decay reading. (2) Leak sensitivity varies inversely with test volume and also directly with decay time and pressure change sensitivity. (3) Any temperature change of the test item during the decay measuring period can invalidate the test results due to the dependence of pressure on temperature. (4) Any change in the internal volume of the test item due to pressure effects will also cause a pressure decrease.

In general, it is desirable to be able to test as fast as possible in order to effect a maximum throughput rate. However, in using short test cycles, there is the problem of adiabatic heating and cooling. That is, when the test item is pressurized, there will be adiabatic heating of the pressurizing gas due to compression. After the test item is closed off, the pressurized gas will cool dissipating the adiabatic heat. During a long test cycle, enough time can be allocated for stabilization to allow any adiabatic heat to dissipate before making the measurement. But in the case of short test cycles, this stabilization time can exceed the total test time. One feature of the present invention is to provide a compensation signal to reduce the effect of the dissipation of the adiabatic heat. The present invention compensates by electrically generating a signal of proper magnitude and duration and introducing it into the signal output of the pressure measuring transducer to cancel the exponential component due to the adiabatic effect.

As previously indicated, one standard approach for testing an item for leaks is to use a reference vessel identical to the test vessel together with a differential pressure transducer so that certain environmental effects are cancelled. The use of the reference vessel technique has certain limitations such as: (1) A ruptured or test vessel having a large leak results in the full test pressure being applied to the differential transducer with possible damage. (2) Some test items such as those made of plastic cannot take continuous repeated pressure cycles. (3) The reference vessel can become cooled by the adiabatic heat during continuous fast testing thereby reducing adiabatic heat cancellation. This effect occurs because the adiabatic heat of pressurization is largely dissipated in the test cycle so that on depressurization at the end of test a reverse adiabatic cooling occurs. When a new test item is quickly tested the cooling is still present in the reference vessel which results in partial cancellation of the adiabatic heat on pressurization. This, of course, does not occur in the test vessel since it is replaced with each test.

The present invention is directed to an improvement by providing a temperature compensation circuit to reduce the effects of adiabatic heat dissipation and also creep in plastic items and allows the use of a simple nondifferential-type pressure measuring transducer.

Furthermore, in the reference vessel type testing method, difficulty arises in trying to quickly pressurize both the test and reference vessel to substantially the same pressure so that the test item is referenced to a known starting point. The present invention provides a memory circuit which memorizes whatever pressure level was actually reached when the vessel was pressurized and then looks at deviation of pressure from this point which is its own artificial zero reference point and overcomes the requirement for accurately pressurizing the test vessel to a predetermined value. In addition, the memory circuit has the advantage of allowing a gross leak to be detected.

The present invention can also be applied to testing with a reference vessel. All of the advantages of testing with an artificial zero still apply and the adiabatic heat compensation can be used to take up any mismatch between the test item and the reference vessel.

SUMMARY

The present invention is directed to an apparatus for testing leaks in a test item in which the item is subjected to a pressurized gas and closed, and a transducer measures the pressure in the closed item. An electrical temperature compensating circuit is connected to the transducer for providing an electrical signal equal and opposite to the effects of the dissipation of adiabatic heat of the pressurized gas in the test item and creep in the test item.

Yet a still further object of the present invention is to provide an apparatus for testing for leaks in a test item which is subjected to a pressurized gas and closed in which the change in the pressure of the gas after the test item is closed is measured in which means are provided for measuring and memorizing the pressure value after the test item is closed. Means are provided for comparing the change in the pressure with the memorized pressure value thereby measuring the extent of any leak in the test item.

Yet a still further object of the present invention is an apparatus for testing leaks in a test item which is subjected to the pressurized gas and closed and a pressure measuring transducer measures the change in the pressure of the gas in the test item in which a first amplifier is provided connected to the transducer for continuously measuring the output from the transducer. A feedback loop is connected across the first amplifier including a second amplifier having a memory retaining means, and means for actuating the feedback loop when the test item is closed, to provide a reference point to the first amplifier so that the output from the first amplifier relative to the reference point is a measurement of the extent of leak in the test item.

Still a further object of the present invention is the provision of an apparatus for testing leaks in a test item in which the effects of ambient temperature changes and adiabatic temperature changes are reduced by subjecting the test item to a negative pressure or vacuum, and closing the test item while being subjected to a vacuum, and providing transducer means for measuring the pressure change in the closed item to determine the extent of any leak in the test item.

Other and further objects, features and advantages will be apparent from the following description of a presently preferred embodiment of the invention, given for the purpose of disclosure, and taken in conjunction with the accompanying drawings where like character references designate like parts throughout the several views.

BRIEF DESCRIPTION OF THE DRAWINGS

FIG. 1 is a schematic of the mechanical installation of the present invention,

FIG. 3 is an electrical schematic of the compensation circuit of the present invention, and FIG. 4 is a graph illustrating offsetting of the dissipation of the adiabatic heating with the compensation network.

DESCRIPTION OF THE PREFERRED EMBODIMENT

Figure 2:
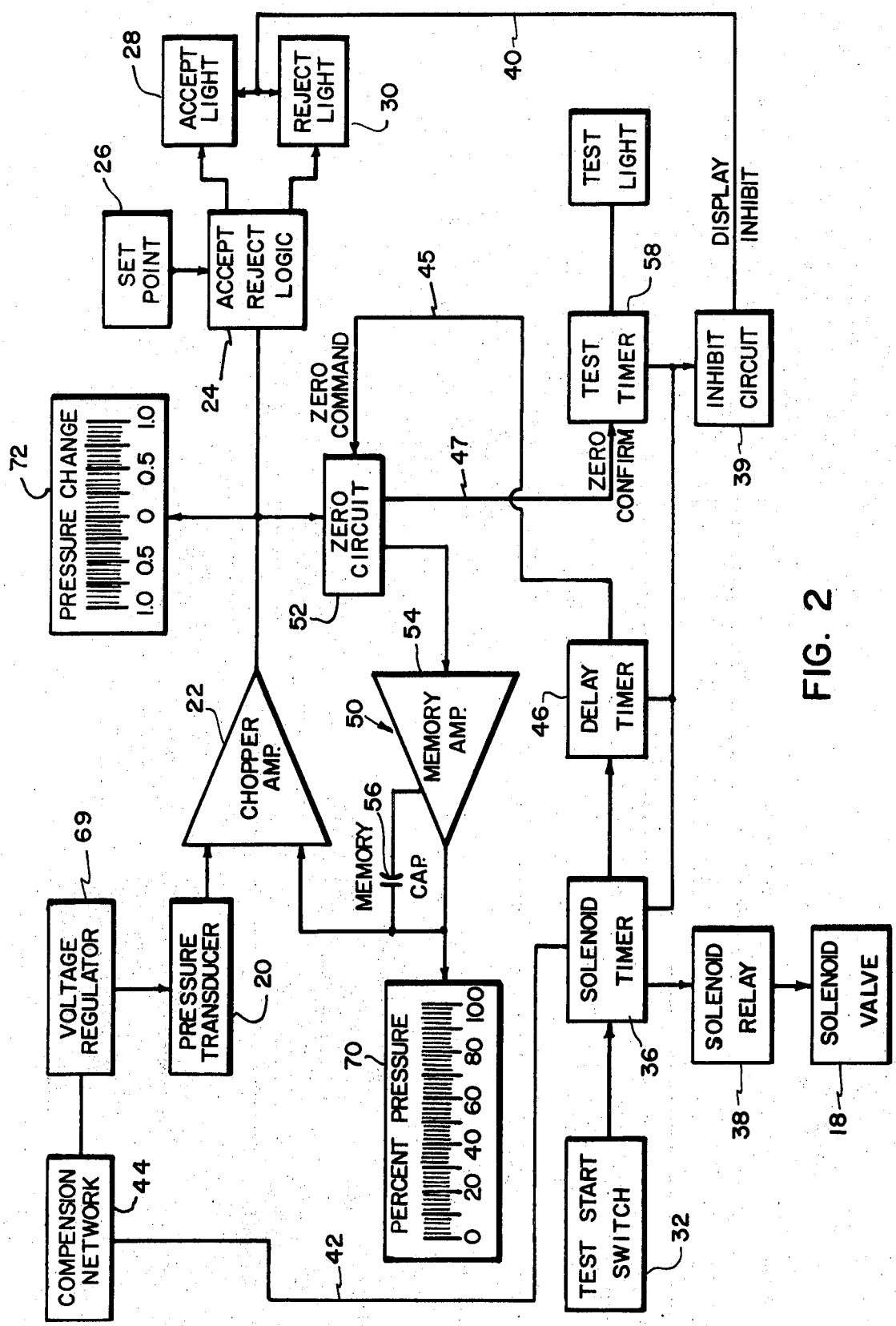
FIG. 2 is an electrical block diagram of the present invention.

While the present invention will be described, for purposes of illustration only, in connection with a type of pressure measuring leak detector system having a nondifferential measuring transducer, it is understood that the present invention may also be used with other types such as the use of a reference vessel and differential transducer type pressure measuring system.

Referring now to the drawings, particularly to FIG. 1, the test item 10 to be tested is connected to a supply line 12 and is subjected to a pressurized gas from a suitable air supply 14, or a vacuum source as will be more fully described hereinafter, through a pressure regulator 16 and a normally-closed solenoid valve 18. The solenoid valve 18 is opened to allow the test item 10 to be subjected to a pressurized gas after which the valve 18 is closed. A conventional pressure transducer 20 measures any pressure decay in the test item 10, and, of course, the pressure change in the test item 10 is an indication and measurement of the extent of a leak, if any, in the test item 10. Any pressure change from the initial pressure after closure for a predetermined time interval is measured to determine possible leakage.

Referring to FIG. 2, the pressure transducer 20 continuously measures the trapped pressure in the test item 10 and its output is transmitted to an amplifier 22. The output from the amplifier 22 is transmitted to a go-no-go logic circuit 24 which determines whether the output from the amplifier 22 is above or below a predetermined amount which is determined by adjusting a set point 26. The logic circuit 24, after the predetermined test interval, measures the amount of pressure change in the test item 10 by means of the transducer 20 and amplifier 22 and if the amount of pressure change is below the set point, signal light 28 lights up indicating that the test specimen is acceptable. If the pressure change which is measured by the logic circuit 24 is above the set point, the circuit 24 actuates light 30 indicating that the test item 10 has an unacceptable leak and is therefore rejected.

Referring to FIG. 1, the test is made by connecting the test item 10 to the line 12. Referring to FIGS. 1 and 2, the test is initiated by depressing start button 32, either manually or automatically, for actuating a solenoid timer 36, which in turn actuates a solenoid relay 38 for opening the normally closed solenoid valve 18 to allow the air supply 14 to pass through the pressure regulator 16 and solenoid valve 18 to pressurize the test item 10. At the same time, the inhibit circuit through line 40 inhibits actuation of the indicator lights 28 and 30. Also at this time period, the solenoid timer 36 through a line 42 actuates a compensation network 44 which will be more fully described hereinafter.

After a predetermined length of time sufficient to pressurize the test item 10, the solenoid timer 36 deactuates the solenoid relay 38 which in turn closes the solenoid valve 18 thereby trapping the pressurized air in the test item 10. If desired, a delayed timer 46 may be provided to delay the start of the test measurement to allow for pressure stabilization in the test item 10; however, timer 46 may be set to zero or deleted to provide a minimum test cycle time.

The pressure transducer 20 is continuously measuring the trapped pressure in the test item 10 and transmitting the measurement to the amplifier 22. The delay timer 46 actuates through line 45 a zeroing and memory circuit generally indicated by the reference numeral 50 which is a feedback loop connected to across the amplifier 22. Circuit 50 generally includes a zeroing circuit 52, a second amplifier 54 and a memory-retaining means such as capacitor 56. The zeroing circuit and memory circuit 50 is used to establish an artificial zero reference against which pressure deviation in the test item 10 may be measured. That is, circuit 50, after pressure is trapped in the test item 10, receives an initial measurement of the pressure in the test item 10 from the output of the amplifier 22 and holds this initial measurement level in the capacitor memory 56 thereby nulling the output from the amplifier 22 to zero. The circuit 50 electrically memorizes the pressure input at the beginning of the testing cycle and then allows the pressure transducer 20 and amplifier 22 to look for a pressure decay from this artificial zero reference point during the testing interval time. The memory circuit 50 provides an important feature in that it memorizes whatever pressure level was actually reached in the test item 10 and then looks at pressure deviation from this point which is the artificial zero reference point from which the set point 26 is measured. Therefore, the present zeroing and memory circuit overcomes the problem encountered in a reference vessel testing apparatus in which the test item and reference item must be quickly pressurized to substantially the same pressure. Otherwise the zero point is inaccurate with reference to the set point which is fixed.

When the zero circuit 52 has reached zero, it actuates the test timer 58 by means of zero confirm signal line 47 which enables the accept-logic circuit 24. The input to the amplifier 22 is compared with the initial pressure which is now stored in the memory capacitor 56 and the pressure decline from this initial pressure is transmitted by the amplifier 22 to the logic circuit 24 for the test period set by the test timer 58 to determine possible leakage of the test item 10. If the output from the amplifier 22 exceeds the set point 26 at any time during the test cycle, the logic circuit 24 stores the reject condition and displays it on reject light 30 at the end of the test. If the output of the amplifier 22 is less than the set point 26, the logic circuit 24 actuates the accept indicating light 28 at the end of the test.

Of course, if the test item 10 has a gross leak, that is a leak so large that all of the pressure is depleted before the test begins, no pressure decay is possible during the test time and therefore the accept light would erroneously indicate that the test item is satisfactory. However, since the zeroing and memorizing circuit 50 measures and memorizes the pressure level in the test item 10 after the solenoid valve 18 is closed, indicating means such as a pressure meter having an output such as a meter 70 is connected to the circuit 50. Meter 70 may measure percent pressure, normally the full scale pressure of the transducer. Therefore, if the meter 70 indicates that the initial pressure measured and memorized by the circuit 50 after the solenoid valve 18 closes is zero, this is an indication that the test item 10 has not been pressurized or has a gross leak, and the test is invalid.

An additional meter having an output meter scale 72 may be provided connected to the output of the amplifier 22 such as a pressure change meter which scale is normally calibrated a percentage of the full scale of the pressure meter 70. Thus meter 72 provides a visual observation of the change in pressure of the test item 10 in addition to the indicating lights 28 and 30.

As previously mentioned, when the test item 10 is pressurized with gas, the pressurized gas is adiabatically heated due to compression. Therefore, after the solenoid valve 18 is closed, the pressurized gas in the item 10 will cool dissipating the adiabatic heat. One feature of the present invention is the feature of negatively pressurizing the item 10 or creating a vacuum in the test item 10 instead of positively pressurizing the test item 10. By placing a vacuum in the test item 10, there will be no adiabatic heating and cooling, and thus the temperature error due to adiabatic heating and cooling is overcome as well as temperature changes caused by changes in ambient temperature. Therefore, the pressure source 14 of FIG. 1 may be either a positive air supply or a vacuum source. In the case of vacuum testing, a leak in the test item 10 will allow the pressure in the test item 10 to increase which is measured by the pressure transducer 20. It is noted that the meter 72 has a zero point in the middle of the readout meter. Movement to the left is a pressure loss measurement for a positive pressurizing of the test item 10. Movement to the right is an indication of a pressure increase which would occur to indicate leakage in a vacuum measuring system.

However, it may be desirable to use a positive pressure measuring system, and in that event the pressure invention is provided with a compensating network 44 to compensate for the pressure loss caused by cooling of adiabatic heating through the test item 10 back to ambient temperature as well as compensating for elastic creep which sometimes occurs in test items of plastic or rubber. The adiabatic heat cooling is essentially an exponential pressure loss relative to time. In order to cancel out the exponential decrease of transducer 20 output voltage, the compensating network 44 introduces an exponential increase in the transducer 20 excitation voltage which is reflected in the transducer output voltage as an increase.

Referring now to FIGS. 3 and 4, the schematic of the temperature compensating circuit 44 and its results are best seen. A conventional voltage regulator 74 is provided receiving a suitable nonregulated voltage 76 and providing a regulated voltage output. The compensation network 44 may include a capacitor 77, a first resistor 78, a second resistor 80, and a switch 82. When the solenoid valve 18 is opened at time A to allow the test item 10 to be pressurized, the switch 82 is simultaneously moved to contact 84 allowing the capacitor 77 to be discharged through the resistor 78. During this time, the cooling of the test gas begins and follows the substantially exponential curve 100 in FIG. 4. At time B, the solenoid valve 18 is closed, and at the same time the switch 82 is moved from contact 84 to contact 86. The capacitor 77 is now allowed to charge through resistor 80. The current I through the compensating network 44 decreases from a high value at the outset to essentially zero after five time constants where:

$$T = RC$$

and $T$ is the time constant in seconds if $R$ is the resistance of resistor 80 in ohms and $C$ is the capacitance of capacitor 77 in farads. The value of $I$ during the time the switch 82 is on contact 86 is:

$$I = V_A/R \exp(-t)/RC \, t)/RC$$

The output from the compensation circuit 44 is connected to a bridge circuit type strain gauge transducer 90 and thus is reflected in the output of transducer 20.

The voltage output of the compensating circuit 44 versus time is indicated in FIG. 4 as 102. It is noted from the graph in FIG. 4 that from time B, when the solenoid valve 18 is closed, to time C, the time when the test is over, that the compensating network output 102 cancels out the cooling due to the adiabatic heating as shown in 100 to produce a composite voltage 104. The composite voltage 104 obtained by adding the curves 100 and 102 is substantially constant. The magnitude of the compensation as well as the slope of curve 102 is changed by varying the variable resistor 80 and the capacitor 77. The magnitude and time constant are larger for larger test items. In comparing equal volumed test items constructed of brass and plastic, the time constant is much longer for the plastic item, while the magnitudes are about the same for both cases.

Thus, the present apparatus tests an item 10 for leakage by charging it with a gas, preferably air, to the test pressure through the solenoid valve 18. When the valve 18 is closed, the pressure transducer 20 continuously measures the trapped pressure in the test item 10. The initial pressure measurement after closure of the valve 18 is stored in the memorizing circuit 50 and any pressure decay from the initial pressure is determined after a time period to measure possible leakage. Precise pressure regulation is not required since the electronic memory circuit 50 resets at an artificial zero point on every test. In addition, vacuum testing of the test item 10 may be provided if desired to overcome temperature problems. And if positive pressure testing is desired, a compensating circuit 44 may be used to cancel out the effects of cooling of the adiabatic heat and also compensate for creep in test item 10.

The present invention, therefore, is well adapted to carry out the objects and attain the ends and advantages mentioned as well as others inherent therein. While a presently preferred embodiment of the invention is given for the purpose of disclosure, numerous changes in the details of construction and arrangement of parts may be made which will readily suggest themselves to those skilled in the art and which are encompassed within the spirit of the invention and the scope of the appended claims.

What is claimed is:

1. An apparatus for testing leaks in a test item comprising, means for subjecting the item to a pressurized fluid, means for closing the test item while being subjected to a pressurized fluid, transducer means for measuring the pressure in the closed item, electrical temperature compensating means connected to the transducer providing an electrical signal equal and opposite to the effects of the dissipation of the adiabatic heat of the pressurized fluid in the test item on the transducer output, means connected to the transducer for measuring an initial pressure value in the item after the test item is closed, and means for comparing the change in the pressure relative to the measured initial pressure value thereby determining the extent of any leak in the test item.

2. The apparatus of claim 1 wherein the compensating means includes, a condenser and a resistor, switching means connecting the condenser and resistor to a voltage source when the test item is closed thereby providing a substantially exponential output.

3. The apparatus of claim 1 including, a first amplifier connected to the transdurcer for continuously measuring the output from the transducer, a feedback loop connected across the first amplifier including a second amplifier having memory retaining means, means for actuating the feedback loop when the test item is closed to provide a reference point to the first amplifier whereby the output from the first amplifier relative to the reference point is a measurement of the extent of any leak in the test item.

4. The apparatus of claim 3 including, indicating means connected to the output of the feedback loop for indicating if the test item is sufficiently pressurized.

* * * * *